United States Patent [19]

Bogan, Jr.

[11] Patent Number: 5,532,307
[45] Date of Patent: Jul. 2, 1996

[54] METHOD FOR FORMING AN AQUEOUS DISPERSION OF CERAMIC MATERIAL

[75] Inventor: Leonard E. Bogan, Jr., Hatfield, Pa.

[73] Assignee: Rohm and Haas Company, Independence Mall, Pa.

[21] Appl. No.: 421,100

[22] Filed: Apr. 13, 1995

[51] Int. Cl.$^6$ .................................................. C08K 3/10
[52] U.S. Cl. ........................ 524/407; 524/413; 524/431; 524/443; 524/446; 524/492; 524/493; 524/558
[58] Field of Search ..................................... 524/407, 413, 524/431, 446, 443, 558, 492, 493

[56] References Cited

U.S. PATENT DOCUMENTS

| | | | |
|---|---|---|---|
| 4,293,475 | 10/1981 | Sidi | 524/558 X |
| 4,303,764 | 12/1981 | Becher et al. | 524/558 |
| 4,330,446 | 5/1982 | Miyosawa | 524/558 X |
| 4,351,754 | 9/1982 | Dupré | 524/558 X |
| 4,537,926 | 8/1985 | Kivel et al. | 524/558 X |
| 4,836,966 | 6/1989 | Shimuzu et al. | 524/558 X |
| 5,084,502 | 1/1992 | Buscall et al. | 524/558 X |
| 5,104,922 | 4/1992 | Chang | 524/558 X |
| 5,209,885 | 5/1993 | Quadir et al. | 264/63 |
| 5,279,994 | 1/1994 | Kerkar | 501/94 |
| 5,360,856 | 11/1994 | Harris et al. | 524/558 X |
| 5,366,669 | 11/1994 | Quadir et al. | 264/6 |

FOREIGN PATENT DOCUMENTS 5279127A  10/1993  Japan.

OTHER PUBLICATIONS

J. de Physique Colloque C1, 47, 1986, pp. 79–83, Slip Casting Parameters For Commercial Silicon Nitride Powders, W. J. A. M. Hartman et al.

J. de Physique Colloque C1, 47, 1986, pp. 73–78, Rheological Properties Of Aqueous Suspensions Of Silicon Nitride–Silicon–Alumina–Zirconia Powders, G. N. Babini et al.

Ceramic Powder Science III, pp. 403–412, 1990 Factors Affecting Interface Properties Of Silicon Nitride Powders in Aqueous Environment, S. G. Malghan et al.

J. Am. Ceram. Soc. 77(11), pp. 2926–2934, 1994, Metal–Organic Surfactants As Sintering Aids For Silicon Nitride In An Aqueous Medium, P. N. Joshi et al.

Colloids And Surfaces, 62 (1992), pp. 87–99, Dispersion Of Si3N4 Powders: Surface Chemical Interactions In Aqueous Media, S. G. Malghan.

*Primary Examiner*—Judy M. Reddick
*Attorney, Agent, or Firm*—Joseph F. Leightner

[57] ABSTRACT

A method for dispersing ceramic materials in aqueous media is disclosed. The method uses water-soluble polymers as dispersants and may be used for dispersing various classes of ceramic materials, including oxide, carbide, and nitride ceramics. The method is useful for dispersing ceramic materials known to present difficulties in forming aqueous dispersions. The polymeric dispersant may be made using conventional polymerization techniques such as solution polymerization.

6 Claims, No Drawings

METHOD FOR FORMING AN AQUEOUS DISPERSION OF CERAMIC MATERIAL

The present invention relates to a method for dispersing ceramic materials. In particular, the present invention relates to a method for dispersing one or more ceramic materials in an aqueous medium by using a polymeric dispersant formed from acid-containing monomers and hydroxy functional monomers.

Ceramic materials are often used to prepare lightweight, strong, thermally and chemically resistant products. Because of difficulties associated with the handling of solid ceramic materials, it is desirable for the ceramic materials to be in the form of an aqueous dispersion. Aqueous dispersions of ceramic materials are, however, often unstable, exhibiting sediment formation upon standing. Upon standing, the dispersion agglomerates and becomes non-homogeneous, and creates difficulty in handling. These agglomerates may also damage pipes, pumps, and other dispersion handling mechanical equipment. The use of dispersants overcomes these difficulties, and also improves strength and density of formed ceramic parts, particularly those made by dry press, slip casting, and tape casting processes.

Polymers are known for use as dispersants for ceramic materials. Typical polymeric dispersants for ceramic materials include polymers formed from acid-containing monomers such as, for example, poly(acrylic acid) and poly(methacrylic acid).

While such polymers perform adequately in dispersing some ceramic materials, certain ceramic materials are more difficult to disperse, and conventional polymeric dispersants are not adequate. Ceramic materials which present particular difficulty in forming dispersions include nitrides such as, for example, silicon nitride. U.S. Pat. No. 5,209,885 describes dispersing silicon nitride for extrusion by the use of a graft copolymer comprising a polyoxyalkylene backbone with polyacrylate side chains.

The present invention seeks to provide a method for dispersing ceramic materials, including several ceramic materials known to be difficult to disperse. The method uses a polymeric dispersant formed from hydroxy functional monomers and acid-containing monomers. The polymeric dispersant of the present invention is a random copolymer rather than a graft copolymer, and it does not require a polyoxyalkylene backbone.

According to the present invention, there is provided a method for dispersing one or more ceramic materials in an aqueous medium, comprising utilizing a polymeric dispersant formed from one or more hydroxy functional monomers and one or more acid-containing monomers, wherein the one or more ceramic materials is selected from: barium titanite, silicon nitride, silica, steatite, chromic oxide, zirconia, and mixtures thereof.

The polymeric dispersant used in the present invention contains, as polymerized units, from 5 percent by weight to 95 percent by weight of one or more hydroxy functional monomers, and from 95 percent to 5 percent by weight of one or more acid-containing monomers, based on the total weight of the polymeric dispersant. Preferably, the amount of hydroxy functional monomer is from 15 percent to 85 percent, and the amount of acid-containing monomer is from 85 to 15 percent, and more preferably the amount of hydroxy functional monomer is from 30 to 70 percent, and the amount of acid-containing monomer is from 70 to 30 percent.

Hydroxy functional monomers useful in forming the polymeric dispersant to be used in the present invention include: hydroxy propyl acrylate, hydroxy propyl methacrylate, hydroxy ethyl acrylate, hydroxy ethyl methacrylate, allyl alcohol, allyloxyethanol, ally propoxylate, vinyl acetate, 1-butene-3,4-diol, and 3-allyloxy- 1,2-propanediol. Also useful are difunctional, trifunctional, and polyfunctional monomers such as, for example, acrylic and methacrylic esters of xylitol or other triol or polyol molecules.

Acid-containing monomers useful in forming the polymeric dispersant to be used in the present invention are monomers selected from the group consisting of $C_3$–$C_6$ monoethylenically unsaturated monocarboxylic acids, $C_4$–$C_8$ monoethylenically unsaturated dicarboxylic acids, and anhydrides of $C_4$–$C_8$ monoethylenically unsaturated cis-dicarboxylic acids. Particular examples of acid-containing monomers useful in forming the polymeric dispersant include: acrylic acid, methacrylic acid, maleic acid, crotonic acid, itaconic acid, mesaconic acid, fumaric acid, citraconic acid, vinylacetic acid, acryloxypropionic acid, 1,2,3,6-tetrahydrophthalic anhydride, 3,6-epoxy-1,2,3,6-tetrahydrophthalic anhydride, 5-norborene-2,3-dicarboxylic anhydride, bicyclo[2.2.2]-5-octene-2,3-dicarboxylic anhydride, 3-methyl-1,2,6-tetrahydrophthalic anhydride, 2-methyl- 1,3, 6-tetrahydrophthalic anhydride. Preferred examples of these carboxylic acid monomers include acrylic acid and methacrylic acid.

The polymeric dispersant used in the present invention is preferably formed by polymerization in solution and is soluble in water. Methods for preparing polymers by solution polymerization are known to those skilled in the art. Solution polymerization processes as described in detail in U.S. Pat. Nos. 4,711,725 and 3,898,037 may be used to form the polymeric dispersant. A suitable solution polymerization technique includes forming an aqueous solution of the monomers and adding an effective amount of polymerization initiator, then maintaining the solution at a temperature of from 70° C. to 99° C. The time required for polymerization will depend upon the monomers used, and the type and amount of polymerization initiator. Typically, the polymerization time is between 3 and 7 hours, but may be between ½ hour and 12 hours. Polymerization initiators are known to those skilled in the art of polymerization. Examples of polymerization initiators include a combination of sodium persulfate and potassium sulfate; hydrogen peroxide; azobisisobutyronitrile; and a ferrous ammonium sulfate/ammonium persulfate redox system; and other commercially available polymerization initiators. If desired, based on the monomer composition, polymerization may be carried out under a controlled atmosphere such as under a nitrogen purge. Optionally, chain transfer agents may be used to control the molecular weight of the polymer. Compounds useful as chain transfer agents are known to those skilled in the art and include ferric and cupric salts, other metal salts including salts containing hypophosphite ions, and primary and secondary alcohols.

The molecular weight of the polymeric dispersant of the present invention is not critical provided that the polymeric dispersant is water soluble. However, for efficiency of the polymeric dispersant, the molecular weight is preferably below 10,000, and more preferably from 2,000 to 5,000. The term "molecular weight", as used herein, refers to the weight average molecular weight as measured by aqueous gel permeation chromatography, using a poly(acrylic acid) standard having a molecular weight of 4,500.

Several factors may affect the preferred quantity of the polymeric dispersant to be used in forming a dispersion of a ceramic material. Because of the range of ceramic materials that might be used for particular applications, and because different applications may require different solids levels, the amount of dispersant may range from 0.0002 percent to 50 percent by weight. For example, the morphology of the ceramic material may affect the optimum level of dispersant. Generally, the more spherical the particles, the less dispersant required. The surface area of the ceramic material may also affect the optimum quantity of dispersant. The higher the surface area of a ceramic material, generally the more dispersant is required. For example, if a wet polish slurry is to be formed from a ceramic powder having a surface area of 0.1 $m^2/g$ and the desired level of ceramic powder is 5 weight percent, an appropriate amount of dispersant would be about 0.00002 percent, by weight, of the total dispersion. A more typical polish formulation, using a ceramic powder having a surface area of 100 $m^2/g$, at 15 weight percent of the dispersion, would require about 9.0 percent dispersant. For forming a ceramic article, a typical example of the amount of ceramic material in the dispersion is 80 weight percent. If the ceramic material had a surface area of 10 $m^2/g$, an appropriate amount of dispersant would be about 2.4 weight percent. Generally, for forming ceramic articles, a preferred range for the amount of dispersant is from 0.01 percent to 10 percent by weight, based on the total weight of the dispersion.

The ionic strength (or water hardness) of the dispersion may also affect the optimum level of dispersant. Dispersions having higher ionic strength generally require more dispersant. The ionic strength of the dispersion can be controlled, for example, by using distilled, deionized, partially distilled or partially deionized water, by controlling the level of contaminants introduced into the dispersion by the various components of the dispersion or by adding one or more conventional chelating agents to the dispersion. Preferably, the water hardness of the dispersion which is attributable to multivalent cations is below about 600 parts per million ("ppm") expressed as $Ca^{2+}$, most preferably below about 500 ppm. Generally, the higher the pH of the dispersion, the lower the quantity of dispersant required. For purposes of the present invention, it is preferred that the pH not be below 6. The polymeric dispersant of the present invention works particularly well at a pH of about 9 to 10. The upper limit of the pH at which the polymeric dispersant of the present invention is useful would be determined by degradation of the ceramic material. This typically occurs at pH above about 10.

Ceramic materials useful in forming a dispersion according to the method of the present invention include oxide, nitride, and carbide ceramics; in particular: barium titanite, silicon nitride, silica, steatite, chromic oxide, and zirconia.

The ceramic material may be present in the dispersion at from 5 percent to 90 percent, based on the total weight of the dispersion. Several factors, including the end-use of the dispersion, may affect the quantity of ceramic material useful in the dispersion. The morphology of a ceramic material may affect the optimal amount of ceramic material in the dispersion. For example, spherical particles may generally be used at a higher concentration than particles of other shapes for a given application. The particle size and particle size distribution of a ceramic material may affect the amount of ceramic material to be used in the dispersion. For example, a bimodal distribution of particle size, meaning a distribution of particle sizes having two maxima, allows for closer packing arrangements than do particle size distributions having one maximum. Therefore, a ceramic material having a bimodal distribution of particle sizes can generally be used at higher levels than a ceramic material with a particle size distribution having one maximum. Also, the greater the density of the ceramic material, the greater the weight percent of the ceramic material in a dispersion on an equal volume basis.

In addition to water, one or more ceramic materials and the one or more polymeric dispersants, the dispersions of the present invention may optionally contain one or more other conventional additives. Conventional additives to an aqueous ceramic material dispersion include, for example, ceramic binders, releasing agents, sintering aids, rheology modifiers, lubricants, defoaming agents and plasticizers. If used, each of the conventional additives may be used at up to 20 percent by weight based on the weight of the ceramic materials in the dispersion, and are preferably used at from 0.01 to 12 percent by weight based on the weight of the ceramic material in the dispersion.

In forming a dispersion according to the method of the present invention, a mixture is made of water, the one or more ceramic materials, one or more polymeric dispersants, and optional additives. The order of addition of the components of the mixture is not critical; however, it is preferable that the polymeric dispersant be dissolved in water and the ceramic material then be added. A mixture is formed by adding from 0.1 percent to 99 percent by weight of one or more ceramic materials, based on the weight of the dispersion. Optionally, a total weight of from 0 percent to 20 percent by weight, based on the weight of the ceramic material, of one or more conventional additives, are added. Conventional additives, if used, may be added at any point in the process of forming the mixture. The mixture is agitated to form an aqueous dispersion of the ceramic material. An aqueous dispersion prepared according to the method of the present invention may be used in processes such as, for example, slip casting, tape casting, gel casting, extrusion and dry pressing.

EXAMPLES

The following examples are intended to illustrate for one of ordinary skill in the art the method of the present invention.

Dispersion of silicon nitride

A dispersant polymer was formed by solution polymerization of 60 percent by weight acrylic acid and 40 percent by weight hydroxy propyl acrylate. A 50% solution of the dispersant polymer in deionized water was made. In 161.6 g of deionized water, 0.324 g of the 50% solution were dissolved. To the resulting solution were added 161.9 g of silicon nitride (SN-E10 from Ube Industries, Ltd.) powder, followed by ball milling for one hour. A dispersion resulted, illustrating that the method may be used to disperse silicon nitride.

What is claimed is:

1. A method for dispersing one or more ceramic materials in an aqueous medium, comprising utilizing a polymeric dispersant consisting of, as polymerized units, one or more hydroxy functional monomers and one or more acid-containing monomers, wherein the one or more ceramic materials is selected from the group consisting of: barium titanate, silicon nitride, silica, steatite, chromic oxide, zirconia, and mixtures thereof with the proviso that said polymeric dispersant is not a graft polymer.

2. The method of claim 1 wherein the hydroxy functional monomer is selected from the group consisting of: hydroxy propyl acrylate, hydroxy propyl methacrylate, hydroxy ethyl acrylate, hydroxy ethyl methacrylate, allyl alcohol, allyloxyethanol, allyl propoxylate, vinyl acetate, 1-butene-3,4-diol, and 3-allyloxy- 1,2-propanediol.

3. The method of claim 1 wherein said acid-containing monomer is selected from the group consisting of $C_3$–$C_6$ monoethylenically unsaturated monocarboxylic acids, $C_4$–$C_8$ monoethylenically unsaturated dicarboxylic acids, and anhydrides of $C_4$–$C_8$ monoethylenically unsaturated cis-dicarboxylic acids.

4. The method of claim 3 wherein said acid-containing monomer is selected from the group consisting of: acrylic acid, methacrylic acid, maleic acid, crotonic acid, itaconic acid, mesaconic acid, fumaric acid, citraconic acid, vinylacetic acid, and acryloxypropionic acid.

5. The method of claim 1 wherein the amount of carboxylic acid monomer is from 30 percent to 70 percent by weight, based on the total weight of monomers, and the amount of hydroxy functional monomer is from 30 percent to 70 percent by weight, based on the total weight of monomers.

6. An aqueous dispersion of ceramic material prepared according to the method of claim 1.

* * * * *